United States Patent
Beck

(10) Patent No.: US 9,826,178 B2
(45) Date of Patent: Nov. 21, 2017

(54) LOGARITHMIC PIXELS WITH CORRELATED DOUBLE SAMPLING

(71) Applicant: SEMICONDUCTOR COMPONENTS INDUSTRIES, LLC, Phoenix, AZ (US)

(72) Inventor: Jeffery Beck, Philomath, OR (US)

(73) Assignee: SEMICONDUCTOR COMPONENTS INDUSTRIES, LLC, Phoeniz, AZ (US)

( * ) Notice: Subject to any disclaimer, the term of this patent is extended or adjusted under 35 U.S.C. 154(b) by 0 days.

(21) Appl. No.: 15/174,506

(22) Filed: Jun. 6, 2016

(65) Prior Publication Data

US 2017/0244917 A1   Aug. 24, 2017

Related U.S. Application Data

(60) Provisional application No. 62/298,120, filed on Feb. 22, 2016.

(51) Int. Cl.
| | |
|---|---|
| *H04N 5/335* | (2011.01) |
| *H04N 5/357* | (2011.01) |
| *H04N 5/355* | (2011.01) |
| *H04N 5/359* | (2011.01) |
| *H04N 5/365* | (2011.01) |
| *H04N 5/378* | (2011.01) |

(52) U.S. Cl.
CPC ......... *H04N 5/3575* (2013.01); *H04N 5/3577* (2013.01); *H04N 5/3592* (2013.01); *H04N 5/35518* (2013.01); *H04N 5/365* (2013.01); *H04N 5/378* (2013.01)

(58) Field of Classification Search
CPC .................................................. H04N 5/35518
USPC .................................................. 348/294, 302
See application file for complete search history.

(56) References Cited

U.S. PATENT DOCUMENTS

| | | | | |
|---|---|---|---|---|
| 6,355,965 | B1 * | 3/2002 | He ................... | H01L 27/14643 257/431 |
| 2003/0234344 | A1 * | 12/2003 | Lai ..................... | H03K 17/145 250/208.1 |
| 2004/0036784 | A1 * | 2/2004 | Bock .................. | H04N 3/155 348/308 |
| 2006/0268127 | A1 * | 11/2006 | Sato ................... | H04N 3/155 348/231.99 |
| 2008/0055441 | A1 * | 3/2008 | Altice ............... | H04N 5/35527 348/297 |

(Continued)

FOREIGN PATENT DOCUMENTS

EP            1475961 A1 *  11/2004  ............ H04N 5/335

*Primary Examiner* — Anthony J Daniels
(74) *Attorney, Agent, or Firm* — Treyz Law Group, P.C.; Joseph F. Guihan

(57) ABSTRACT

An imaging pixel may be operated in either a linear mode or a logarithmic mode. In the logarithmic mode, the voltage at a floating diffusion region may be proportional to the logarithm of the intensity of incident light. In order to enable correlated double sampling (CDS) in the logarithmic mode, a transistor may be provided that couples the photodiode to a bias voltage. When the transistor is turned off, the photodiode may be able to operate in a logarithmic mode. When the transistor is turned on, the floating diffusion region may be reset to a baseline voltage level. Images from the linear mode and the logarithmic mode may be combined to form high dynamic range images with flicker mitigation.

11 Claims, 6 Drawing Sheets

(56) References Cited

U.S. PATENT DOCUMENTS

2009/0051798 A1 2/2009 Takayanagi
2016/0323524 A1* 11/2016 Smith ................ H04N 5/23245

* cited by examiner

US 9,826,178 B2

LOGARITHMIC PIXELS WITH CORRELATED DOUBLE SAMPLING

CROSS-REFERENCE TO RELATED APPLICATION(S)

This application claims priority to U.S. Provisional Application No. 62/298120, filed on Feb. 22, 2016, entitled "Logarithmic Pixels with Correlated Double Sampling," invented by Jeffery Beck, and is incorporated herein by reference and priority thereto for common subject matter is hereby claimed.

BACKGROUND

This relates generally to imaging systems and, more particularly, to imaging systems that have logarithmic pixels.

Modern electronic devices such as cellular telephones, cameras, and computers often use digital image sensors. Image sensors (sometimes referred to as imagers) may be formed from a two-dimensional array of image sensing pixels. Each pixel includes a photosensitive layer that receives incident photons (light) and converts the photons into electrical charge. Image sensors are sometimes designed to provide images to electronic devices using a Joint Photographic Experts Group (JPEG) format.

Image sensors may include logarithmic pixels or linear pixels. Linear pixels may accumulate charge in a photosensitive layer over some integration time. After the integration time is complete, the accumulated charge may be transferred and sampled. The sampled voltage that is associated with the accumulated charge may be proportional to the intensity of the incident light. Alternatively, logarithmic pixels may continuously measure light intensity without accumulating charge. At any point, a voltage in the logarithmic pixel may be sampled that is proportional to the logarithm of the intensity of the incident light. Because logarithmic pixels are continuously measuring exposure to incident light, it may be difficult to remove noise from the sample. Logarithmic pixels may therefore be subject to pixel fixed pattern noise.

It would therefore be desirable to provide improved logarithmic pixels.

DETAILED DESCRIPTION

Figure 1:
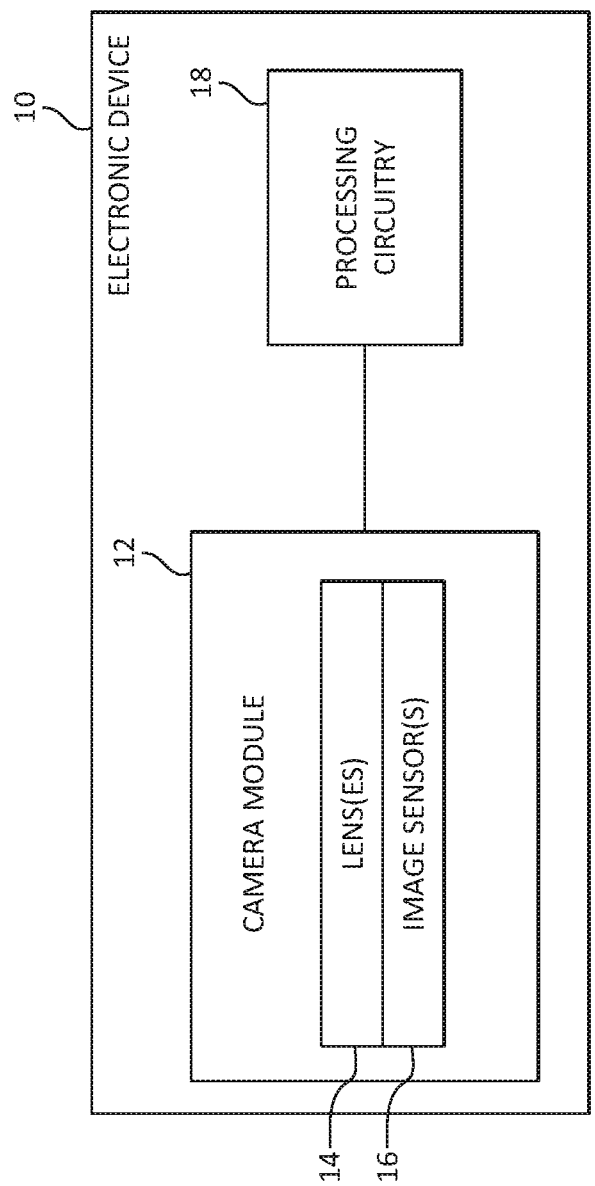
FIG. 1 is a schematic diagram of an illustrative electronic device that may include an image sensor in accordance with an embodiment of the present invention.

Embodiments of the present invention relate to image sensors with pixels that may be operated in a logarithmic mode. An illustrative electronic device that may include logarithmic pixels is shown in FIG. 1. Electronic device 10 may be a digital camera, a computer, a cellular telephone, a medical device, or other electronic device. Camera module 12 (sometimes referred to as an imaging device) may include image sensor 16 and one or more lenses 14. During operation, lenses 14 focus light onto image sensor 16. Image sensor 16 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 16 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 16 may be provided to processing circuitry 18. Processing circuitry 18 may be used to perform image processing functions such as automatic focusing functions, depth sensing, data formatting, adjusting white balance and exposure, implementing video image stabilization, face detection, etc.

Processing circuitry 18 may also be used to compress raw camera image files if desired (e.g., to Joint Photographic Experts Group or JPEG format). In a typical arrangement, which is sometimes referred to as a system on chip (SOC) arrangement, image sensor 16 and processing circuitry 18 are implemented on a common integrated circuit. The use of a single integrated circuit to implement image sensor 16 and processing circuitry 18 can help to reduce costs. This is, however, merely illustrative. If desired, image sensor 16 and processing circuitry 18 may be implemented using separate integrated circuits. Processing circuitry 18 may include microprocessors, microcontrollers, digital signal processors, application specific integrated circuits, or other processing circuits.

Figure 2:
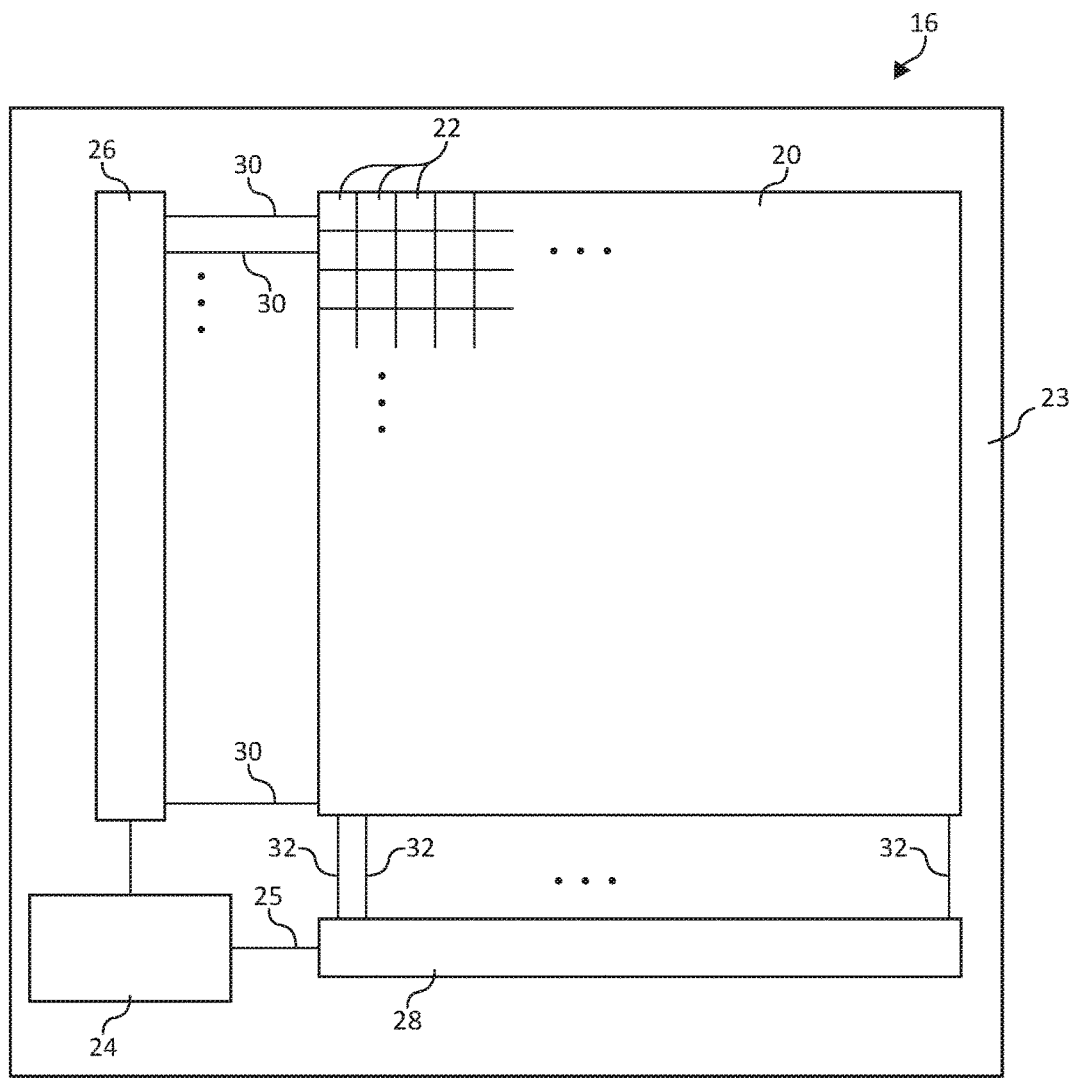
FIG. 2 is a diagram of an illustrative pixel array and associated readout circuitry for reading out image signals from the pixel array in accordance with an embodiment of the present invention.

As shown in FIG. 2, image sensor 16 may include pixel array 20 containing image sensor pixels 22 arranged in rows and columns (sometimes referred to herein as image pixels or pixels) and control and processing circuitry 24 (which may include, for example, image signal processing circuitry). Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry).

Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

Figure 3:
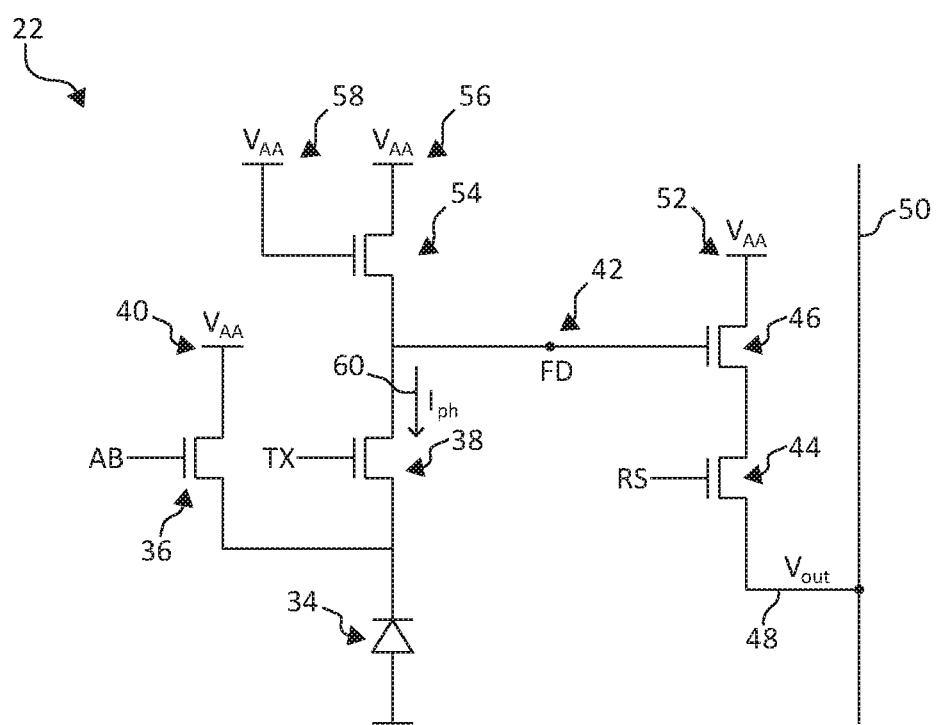
FIG. 3 is a diagram of an illustrative imaging pixel that may be used in a logarithmic mode with correlated double sampling in accordance with an embodiment of the present invention.

An illustrative image pixel is shown in FIG. 3. As shown, pixel 22 may include a photodiode 34. Photodiode 34 may be a pinned photodiode. Photodiode 34 may be an n-type photodiode formed from a doped semiconductor material such as silicon. Photodiode 34 may be coupled to transistor 36 and transistor 38. Transistor 36 may be referred to as an anti-blooming (AB) transistor, and transistor 38 may be referred to as a transfer (TX) transistor. Photodiode 34 may generate charge when exposed to incident light. If both transfer transistor 38 and anti-blooming transistor 36 are off (or open), the generated charge may accumulate in the photodiode. If the anti-blooming transistor is asserted, the photodiode may be coupled to bias voltage 40 ($V_{AA}$). When coupled to bias voltage 40, photodiode 34 may be cleared of all charge.

If anti-blooming transistor 36 is off (or open) and transfer transistor 38 is asserted, charge from photodiode 34 may pass through the transfer transistor. Pixel 22 may also include a floating diffusion region 42. Floating diffusion (FD) region 42 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 34. The signal associated with the stored charge on floating diffusion 42 may be conveyed to row select transistor 44 by source-follower transistor 46. Source-follower transistor 46 may be coupled to bias voltage 52 ($V_{AA}$).

When it is desired to read out the value of the charge at the floating diffusion region, row select (RS) transistor 44 may be asserted. When the RS transistor is asserted, a corresponding signal $V_{OUT}$ that is representative of the magnitude of the charge on floating diffusion region 42 is produced on output path 48. In a typical configuration, there are numerous rows and columns of pixels such as pixel 22 in the image sensor pixel array of a given image sensor. A vertical conductive path such as path 50 may be associated with each column of pixels.

Pixel 22 may also include control transistor 54. In certain circumstances, pixel 22 may be operated as a linear pixel. When pixel 22 is operated as a linear pixel, charge may accumulate in photodiode 34 over an integration time. After the integration time is complete, the transfer transistor may be asserted to transfer the charge to floating diffusion region 42. While pixel 22 is operated as a linear pixel, control transistor 54 may operate as a reset transistor for resetting floating diffusion 42. Control transistor 54 may be coupled to bias voltage 56 and bias voltage 58. While pixel 22 is operated as a linear pixel, bias voltage 58 may remain low so that charge cannot flow through transistor 54. When it is time to reset floating diffusion 42, bias voltage 58 may be raised so that excess charge from floating diffusion 42 flows through transistor 54 and is cleared from the floating diffusion.

At other times, pixel 22 may be operated as a logarithmic pixel. While pixel 22 is operated as a logarithmic pixel, bias voltage 58 may be raised to the same level as bias voltage 56. Transfer transistor 38 may be asserted and anti-blooming transistor 36 may be turned off while pixel 22 is operated as a logarithmic pixel. Transistor 36 being turned off while transistor 38 is asserted and bias voltage 58 is held at the same level as bias voltage 56 may establish a photocurrent ($I_{ph}$) 60. The presence of photocurrent 60 may enable a logarithmic response to incident light at floating diffusion 42. Additionally, the presence of anti-blooming transistor 36 may enable the logarithmic pixel to undergo correlated double sampling (CDS).

Correlated double sampling is used to correct for noise in imaging pixels. As previously discussed, voltage at the floating diffusion region may be sampled to determine the amount of incident light exposure for the imaging pixel. Ideally, all of the voltage at the floating diffusion region would be associated with the incident light. However, in reality this is not the case and some of the voltage will be present due to noise. In order to isolate the voltage that comes from the incident light, correlated double sampling compares the reset voltage level at the FD to the sample voltage level at the FD. The reset voltage level is the amount of voltage that comes from noise, while the sample voltage level includes voltage from noise and incident light. The reset voltage level may be subtracted from the sample voltage level to isolate the amount of voltage associated with the incident light.

In typical logarithmic pixels, there is no way to reset the voltage at the floating diffusion region for correlated double sampling. Because typical logarithmic pixels cannot perform correlated double sampling, they are susceptible to noise. In contrast, pixel 22 of FIG. 3 includes anti-blooming transistor 36 which enables correlated double sampling in a logarithmic mode. As previously mentioned, transistor 36 may be turned off to allow photocurrent $I_{ph}$ to flow through transistors 54 and 38 to create a logarithmic response to light at the floating diffusion region. When transistor 36 is turned on, however, the photocurrent may be diverted through transistor 36. Accordingly, no photocurrent passes through transistors 38 and 54 when transistor 36 is asserted. As a result, the floating diffusion will not have a response to incident light and will revert to a base voltage level. By sampling the voltage at FD once while transistor 36 is disabled and once while transistor 36 is enabled, noise can be accounted for in the logarithmic pixel. Noise, in this case, is typically associated with the pixel-to-pixel variation in threshold voltage of transistor 54.

Figure 4:
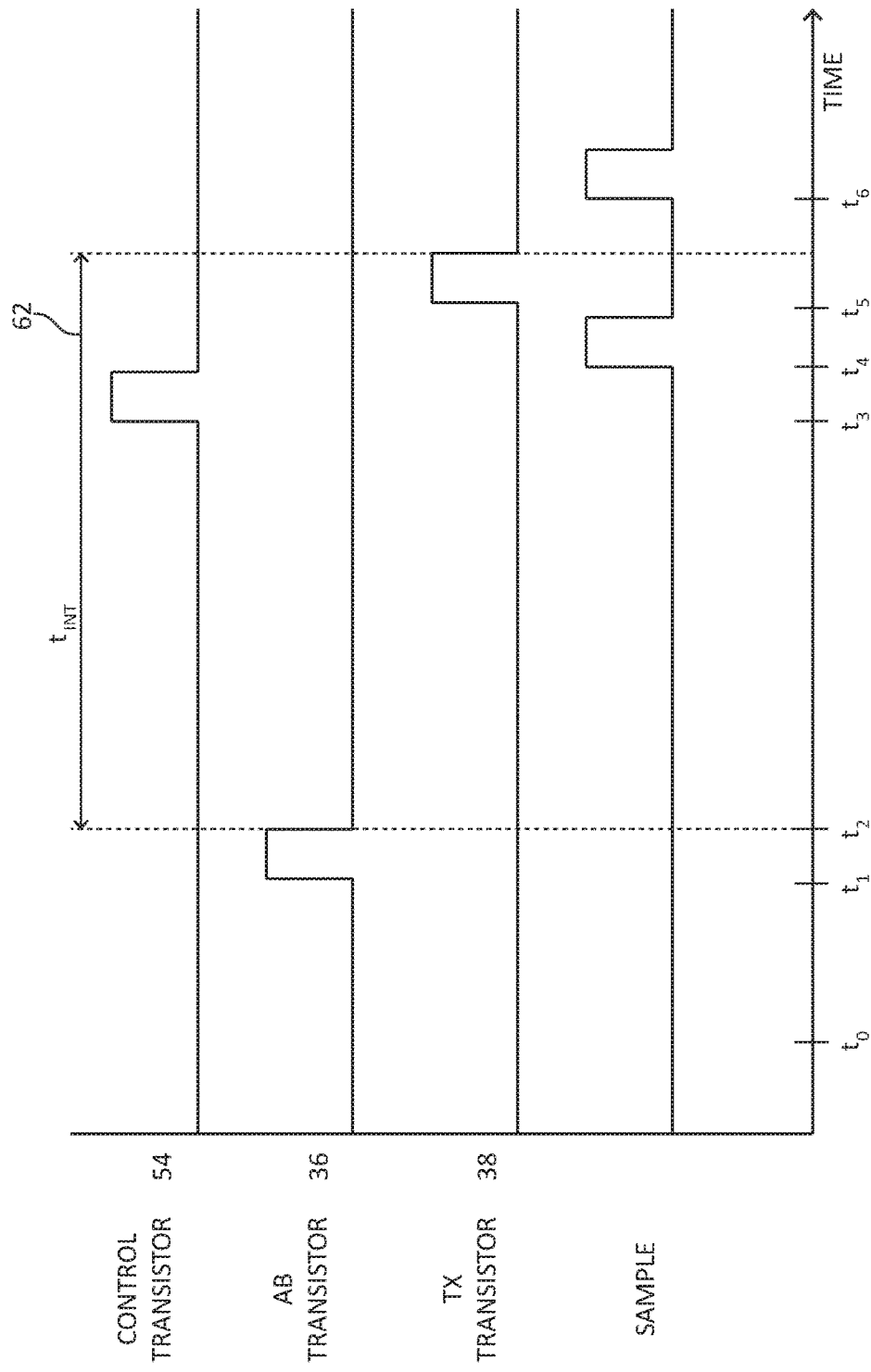
FIG. 4 is a diagram of an illustrative timing scheme for asserting various transistors in an imaging pixel while the imaging pixel operates in a linear mode in accordance with an embodiment of the present invention.

FIG. 4 is a diagram of an illustrative timing scheme for asserting various transistors in pixel 22. FIG. 4 shows operation of pixel 22 while pixel 22 is in a linear mode (i.e., operating as a linear pixel). As shown, anti-blooming transistor 36 may be asserted at $t_1$. Asserting transistor 36 may couple photodiode 34 to bias voltage 40 and clear photodiode 34 of charge. Transistor 36 may be disabled at $t_2$, starting integration time ($t_{INT}$) 62. During the integration time, charge generated by photodiode 34 may accumulate in photodiode 34.

At time $t_3$, control transistor 54 may be asserted. This may couple floating diffusion region 42 to bias voltage 60 and clear floating diffusion region 42 of excess charge. After control transistor 54 is asserted, the reset charge level at the floating diffusion region may be sampled at time $t_4$. This sample corresponds to the level of charge at FD 42 present from noise. Next, transfer transistor 38 may be asserted at time $t_5$. Asserting transfer transistor 38 may transfer the accumulated charge from photodiode 34 to floating diffusion 42. At time $t_6$, the charge at the floating diffusion region may be sampled again. This sample will correspond to the level of charge at FD 42 present from both noise and incident light. The two samples may then be subtracted to determine the incident light level. As previously discussed, sampling the reset charge level and subtracting it from the sample charge level in this way is known as correlated double sampling.

Figure 5:
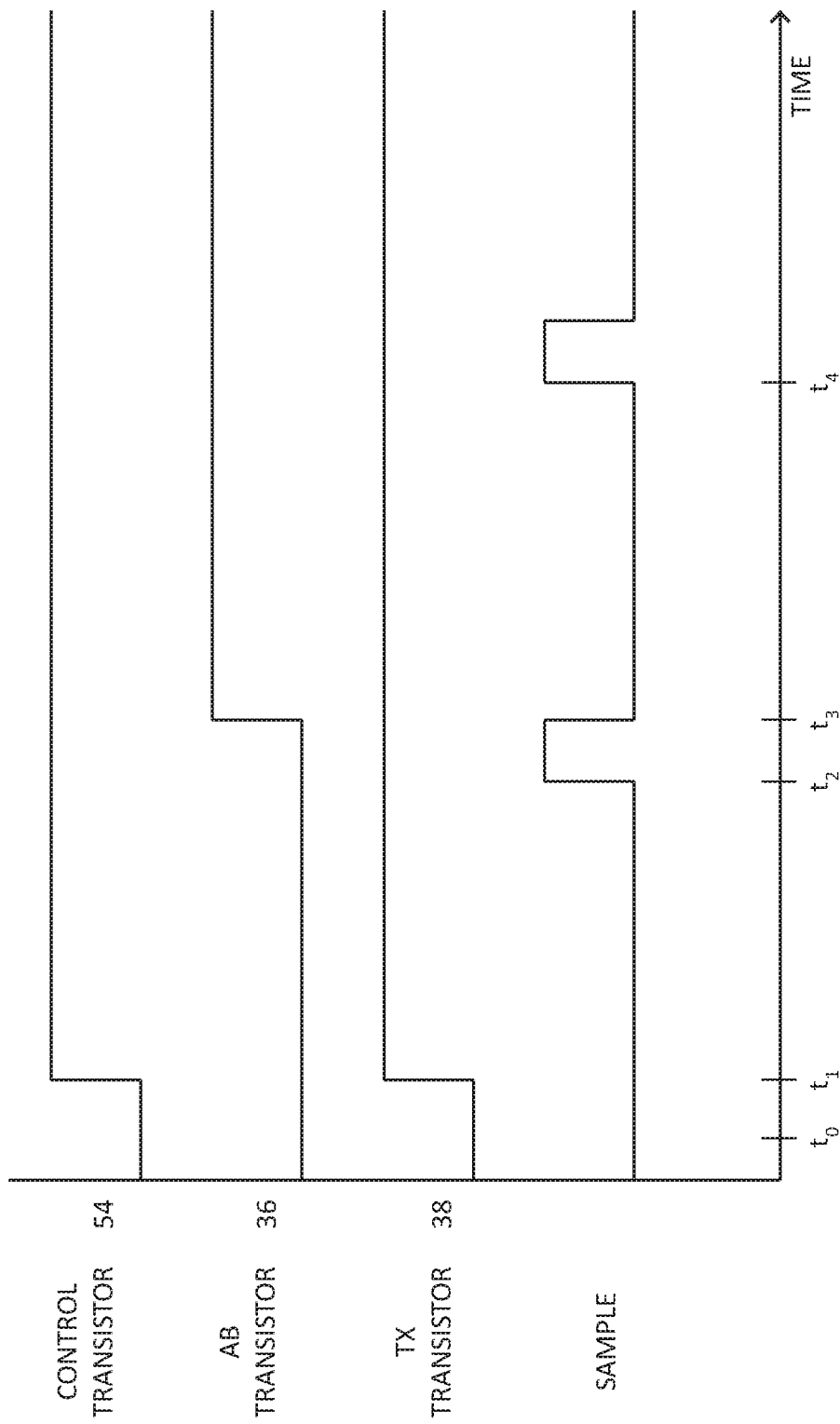
FIG. 5 is a diagram of an illustrative timing scheme for asserting various transistors in an imaging pixel while the imaging pixel operates in a logarithmic mode in accordance with an embodiment of the present invention.

FIG. 5 is a diagram of an illustrative timing scheme for asserting various transistors in pixel 22. FIG. 5 shows operation of pixel 22 while pixel 22 is in a logarithmic mode (i.e., operating as a logarithmic pixel). As shown, control transistor 54 and transistor 38 may be asserted at $t_1$. When control transistor 54 is asserted, bias voltage 58 may be raised to a similar level as bias voltage 56. At $t_1$, AB transistor 36 remains disabled. This arrangement of the transistors results in a logarithmic response to incident light at FD 42. At $t_2$, the voltage level at FD 42 may be sampled. Afterwards, AB transistor 36 may be asserted at time $t_3$. By asserting AB transistor 36, the photocurrent may be funneled through the AB transistor. Accordingly, the voltage level at the floating diffusion region will revert to a baseline level. The baseline voltage at floating diffusion region FD may then be sampled at $t_4$. Using this timing scheme, pixel 22 may be operated in a logarithmic mode where correlated double sampling is used to improve the accuracy of the sampling.

Figure 6:
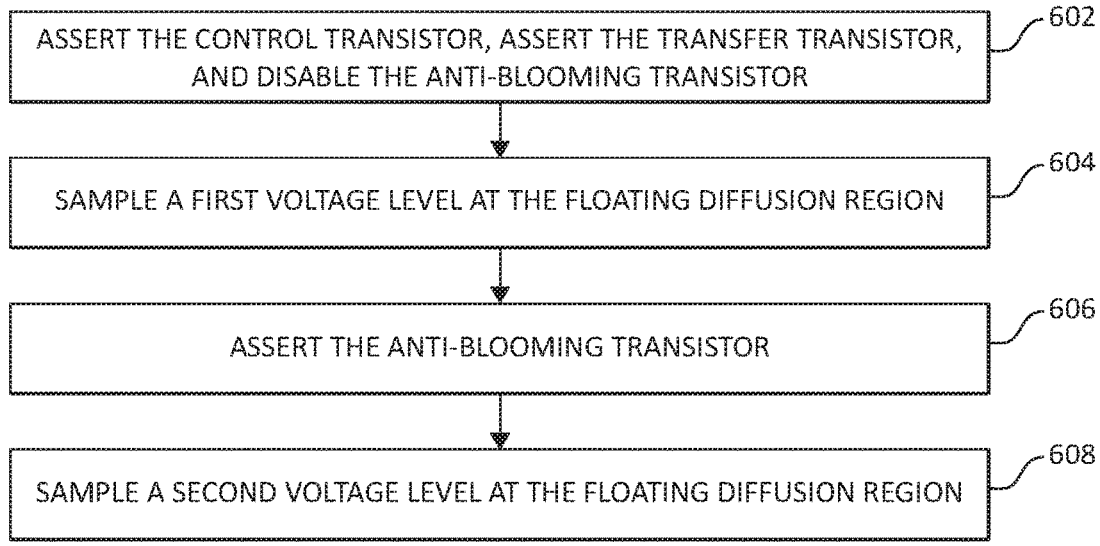
FIG. 6 is a diagram of illustrative steps for operating an imaging pixel in a logarithmic mode in accordance with an embodiment of the present invention.

FIG. 6 is a diagram of illustrative steps for operating an imaging pixel such as pixel 22 in a logarithmic mode. As shown, at step 602 the control transistor and transfer transistor may be asserted. Also at step 602, the anti-blooming transistor may be disabled. This arrangement results in a logarithmic response to incident light at the pixel's floating diffusion region. At step 604, a first voltage level at the floating diffusion region may be sampled. Subsequently, the anti-blooming transistor may be asserted at step 606. Asserting the anti-blooming transistor results in the floating diffusion region having no response to incident light and reverting to a baseline voltage level. At step 608, a second voltage level at the floating diffusion region may be sampled. Processing circuitry may be used to subtract the sample of the second voltage level from the sample of the first voltage level. This will result in a logarithmic pixel sample with noise eliminated via correlated double sampling.

In imaging systems, image artifacts may be caused by moving objects, flickering lighting, and objects with changing illumination in an image frame. Such artifacts may include, for example, missing parts of an object, edge color artifacts, and object distortion. Examples of objects with changing illumination include light-emitting diode (LED) traffic signs (which can flicker several hundred times per second) and LED brake lights or headlights of modern cars. Zones in an image frame that are not fully exposed to dynamic scenery may result in object distortion, ghosting effects, and color artifacts when the scenery includes moving or fast-changing objects. Similar effects may be observed when the camera is moving or shaking during image capture operations. In order to capture images with minimized artifacts related to flickering lighting and objects with changing illumination, flicker mitigation (FM) techniques may be used. Additionally, imaging systems also may have images with artifacts associated with low dynamic range. Scenes with bright and dark portions may produce artifacts in conventional image sensors, as portions of the image may be over exposed or under exposed. Therefore, high dynamic range images may be used in certain circumstances to avoid artifacts. Imaging pixels such as pixel 22 in FIG. 3 may be used to capture high dynamic range images with flicker mitigation.

Figure 7:
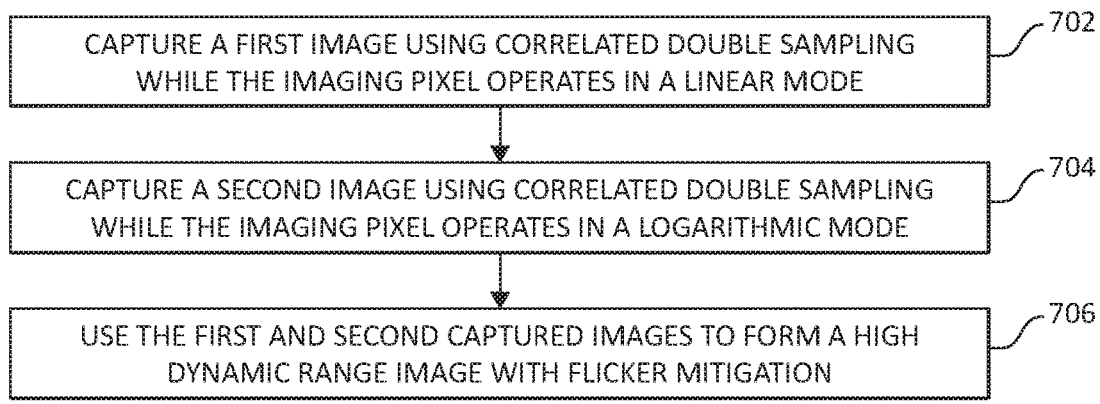
FIG. 7 is a diagram of illustrative steps for operating an imaging pixel in a linear mode and a logarithmic mode in accordance with an embodiment of the present invention.

FIG. 7 is a diagram of illustrative steps for operating an imaging pixel such as pixel 22. In FIG. 7, pixel 22 may be first operated in a linear mode at step 702. At step 702, a first image may be captured using correlated double sampling while the pixel is in the linear mode. Operating the imaging pixel in the linear mode may include accumulating charge in the photodiode over an integration time as described in connection with FIG. 4.

After capturing the first image in the linear mode, the pixel may operate in a logarithmic mode at step 704. At step 704, a second image may be captured using correlated double sampling while the imaging pixel operates in a logarithmic mode. Operating the imaging pixel in the logarithmic mode may include establishing a photocurrent such that the floating diffusion region has a logarithmic response to incident light as described in connection with FIG. 5. At step 706, the first and second captured images may be used to form a high dynamic range image with flicker mitigation. For example, while operating in the linear mode a long integration time may be used to capture a low light level sample. The pixel may then be used to capture a high light level sample while in the logarithmic mode. The two images may be combined to form a high dynamic range image. Additionally, the two images may be analyzed to detect flickering lights and reduce image artifacts associated with flickering lighting and objects with changing illumination.

In various embodiments of the invention, a method of operating an imaging pixel with a photodiode, a first transistor coupled between the photodiode and a first bias voltage, a second transistor coupled between the photodiode and a second bias voltage, and a floating diffusion region may include disabling the first transistor, asserting the second transistor, sampling a first voltage level at the floating diffusion region after disabling the first transistor and asserting the second transistor, asserting the first transistor after sampling the first voltage level at the floating diffusion region, and sampling a second voltage level at the floating diffusion region after asserting the first transistor.

The imaging pixel may also include a third transistor that is coupled between the second transistor and the photodiode. The method may also include asserting the third transistor before sampling the first voltage level at the floating diffusion region. Asserting the first transistor may result in charge generated in the photodiode flowing through the first transistor and exiting the imaging pixel. Disabling the first transistor, asserting the second transistor, and asserting the third transistor may result in the floating diffusion region having a logarithmic response to incident light. Disabling the first transistor, asserting the second transistor, and asserting the third transistor may result in a photocurrent flowing through the second and third transistors. Sampling the first voltage level may include sampling the first voltage level while the first transistor is disabled, the second transistor is asserted, and the third transistor is asserted. Sampling the second voltage level at the floating diffusion region may include sampling the second voltage level while the first transistor is asserted, the second is asserted, and the third transistor is asserted.

The method may also include subtracting the sample of the second voltage level from the sample of the first voltage level with processing circuitry. Asserting the first transistor after sampling the first voltage level at the floating diffusion region may include asserting the first transistor while the second transistor remains asserted. Operating the imaging pixel may include operating the imaging pixel in a logarithmic mode. Operating the imaging pixel in the logarithmic mode may include operating the imaging pixel in the logarithmic mode with correlated double sampling.

In various embodiments, a method of operating an imaging pixel with a photodiode, an anti-blooming transistor, a transfer transistor, a control transistor, and a floating diffusion region in a logarithmic mode may include sampling a first voltage level at the floating diffusion region while the anti-blooming transistor is disabled and sampling a second voltage level at the floating diffusion region while the anti-blooming transistor is asserted.

Sampling the first voltage level at the floating diffusion region while the anti-blooming transistor is disabled may include sampling the first voltage level while the anti-blooming transistor is disabled, the transfer transistor is asserted, and the control transistor is asserted. Sampling the second voltage level at the floating diffusion region while the anti-blooming transistor is asserted may include sampling the second voltage level at the floating diffusion region while the anti-blooming transistor is asserted, the transfer transistor is asserted, and the control transistor is asserted. The anti-blooming transistor may be coupled to a first bias voltage, and the control transistor may be coupled to a second bias voltage.

In various embodiments, a method of operating an imaging pixel with a photodiode may include capturing a first image using correlated double sampling while the imaging pixel operates in a linear mode and capturing a second image using correlated double sampling while the imaging pixel operates in a logarithmic mode. Operating the imaging pixel in the linear mode may include accumulating charge in the photodiode over an integration time. The imaging pixel may include a floating diffusion region. Operating the imaging pixel in the logarithmic mode may include establishing a photocurrent such that the floating diffusion region has a logarithmic response to incident light. The method may also include using the first and second captured images to form a high dynamic range image with flicker mitigation.

The foregoing is merely illustrative of the principles of this invention and various modifications can be made by those skilled in the art without departing from the scope and spirit of the invention.

What is claimed is:

1. A method of operating an imaging pixel, wherein the imaging pixel comprises a photodiode, an anti-blooming transistor coupled between the photodiode and a first bias voltage, a transfer transistor coupled between the photodiode and a floating diffusion region, and a control transistor coupled between the floating diffusion region and a second bias voltage, the method comprising:
   disabling the anti-blooming transistor;
   asserting the transfer transistor;
   asserting the control transistor;
   after disabling the anti-blooming transistor and asserting the control transistor, sampling a first voltage level at the floating diffusion region, wherein sampling the first voltage level comprises sampling the first voltage level while the anti-blooming transistor is disabled, the control transistor is asserted, and the transfer transistor is asserted;
   after sampling the first voltage level at the floating diffusion region, asserting the anti-blooming transistor; and
   after asserting the anti-blooming transistor, sampling a second voltage level at the floating diffusion region, wherein sampling the second voltage level at the floating diffusion region comprises sampling the second voltage level while the anti-blooming transistor is asserted, the control transistor is asserted, and the transfer transistor is asserted.

2. The method defined in claim 1, wherein asserting the anti-blooming transistor results in charge generated in the photodiode flowing through the anti-blooming transistor and exiting the imaging pixel.

3. The method defined in claim 1, wherein disabling the anti-blooming transistor, asserting the control transistor, and asserting the transfer transistor results in the floating diffusion region having a logarithmic response to incident light.

4. The method defined in claim 1, wherein disabling the anti-blooming transistor, asserting the control transistor, and asserting the transfer transistor results in a photocurrent flowing through the control and transfer transistors.

5. The method defined in claim 1, further comprising:
   with processing circuitry, subtracting the sample of the second voltage level from the sample of the first voltage level.

6. The method defined in claim 1, wherein operating the imaging pixel comprises operating the imaging pixel in a logarithmic mode.

7. A method of operating an imaging pixel in a logarithmic mode, wherein the imaging pixel comprises a photodiode, a floating diffusion region, an anti-blooming transistor coupled between the photodiode and a first bias voltage, a transfer transistor coupled between the photodiode and the floating diffusion region, and a control transistor coupled between the floating diffusion region and a second bias voltage, the method comprising:
   sampling a first voltage level at the floating diffusion region while the anti-blooming transistor is disabled, the transfer transistor is asserted, and the control transistor is asserted; and
   sampling a second voltage level at the floating diffusion region while the anti-blooming transistor is asserted, the transfer transistor is asserted, and the control transistor is asserted.

8. The method defined in claim 7, the method further comprising:
   with processing circuitry, subtracting the sample of the second voltage level from the sample of the first voltage level.

9. The method defined in claim 7, wherein a gate of the control transistor receives the second bias voltage when the control transistor is asserted.

10. A method of operating an imaging pixel with a photodiode, a floating diffusion region, an anti-blooming transistor coupled between the photodiode and a first bias voltage, a transfer transistor coupled between the photodiode and the floating diffusion region, and a control transistor coupled between the floating diffusion region and a second bias voltage, the method comprising:

capturing a first image using correlated double sampling while the imaging pixel operates in a linear mode, wherein capturing the first image using correlated double sampling while the imaging pixel operates in the linear mode comprises:

disabling the control transistor;

asserting the anti-blooming transistor to reset the photodiode and begin an integration time;

while the transfer transistor is disabled, asserting the control transistor to reset the floating diffusion region to a first voltage;

sampling the first voltage while the transfer transistor, anti-blooming transistor, and control transistors are disabled;

asserting the transfer transistor to end the integration time and transfer charge from the photodiode to the floating diffusion region;

after asserting the transfer transistor to end the integration time and transfer charge from the photodiode to the floating diffusion region, sampling a second voltage while the transfer transistor, anti-blooming transistor, and control transistors are disabled; and with processing circuitry, subtracting the sample of the first voltage level from the sample of the first second level; and capturing a second image using correlated double sampling while the imaging pixel operates in a logarithmic mode, wherein capturing the second image using correlated double sampling while the imaging pixel operates in the logarithmic mode comprises:

sampling a third voltage level at the floating diffusion region while the anti-blooming transistor is disabled, the transfer transistor is asserted, and the control transistor is asserted;

sampling a fourth voltage level at the floating diffusion region while the anti-blooming transistor is asserted, the transfer transistor is asserted, and the control transistor is asserted; and with the processing circuitry, subtracting the sample of the fourth voltage level from the sample of the third voltage level.

11. The method defined in claim 10, further comprising:
using the first and second captured images to form a high dynamic range image with flicker mitigation.

* * * * *